US008472886B2

(12) United States Patent
Haas et al.

(10) Patent No.: US 8,472,886 B2
(45) Date of Patent: Jun. 25, 2013

(54) MOBILE AND BASE STATION TRANSCEIVER APPARATUS FOR COMMUNICATING

(75) Inventors: Harald Haas, Edinburgh (GB); Gunther Auer, Munich (DE); Zubin Bharucha, Edinburgh (DE)

(73) Assignee: NTT DoCoMo, Inc., Tokyo (JP)

( * ) Notice: Subject to any disclaimer, the term of this patent is extended or adjusted under 35 U.S.C. 154(b) by 419 days.

(21) Appl. No.: 12/828,540

(22) Filed: Jul. 1, 2010

(65) Prior Publication Data

US 2011/0003611 A1 Jan. 6, 2011

(30) Foreign Application Priority Data

Jul. 1, 2009 (EP) .................................. 09008637

(51) Int. Cl.
*H04B 1/38* (2006.01)
(52) U.S. Cl.
USPC .......... 455/73; 455/447; 455/450; 455/452.1; 455/63.1; 455/442; 455/522; 455/67.11; 370/331; 370/342; 370/329
(58) Field of Classification Search
USPC ............... 455/73, 447, 450, 452.1, 452.2, 62, 455/63.1, 442, 436, 13.4, 522, 67.11, 501, 455/509, 69, 67.13; 370/330, 331, 329, 337
See application file for complete search history.

(56) References Cited

U.S. PATENT DOCUMENTS

| | | | |
|---|---|---|---|
| 6,167,240 A | | 12/2000 | Carlsson et al. |
| 7,403,499 B2* | | 7/2008 | Shapira .......................... 370/328 |
| 7,406,065 B2* | | 7/2008 | Willenegger et al. ......... 370/335 |
| 7,616,596 B2* | | 11/2009 | Lee et al. ....................... 370/326 |
| 7,636,381 B2* | | 12/2009 | Forenza et al. ................. 375/141 |
| 7,715,866 B2* | | 5/2010 | Seppinen et al. .............. 455/522 |
| 7,751,843 B2* | | 7/2010 | Butala ............................ 455/522 |
| 7,801,105 B2* | | 9/2010 | Larsson et al. ................. 370/347 |
| 7,835,750 B2* | | 11/2010 | Khan ............................. 455/447 |
| 7,873,338 B2* | | 1/2011 | Visotsky et al. ............ 455/226.2 |

(Continued)

FOREIGN PATENT DOCUMENTS

| EP | 1 895 795 A2 | 3/2008 |
|---|---|---|
| JP | 2001-517047 A | 10/2001 |
| JP | 2008-061250 A | 3/2008 |
| WO | 99/14967 A1 | 3/1999 |
| WO | 2008/011879 A1 | 1/2008 |
| WO | 2008/097792 A2 | 8/2008 |

OTHER PUBLICATIONS

A. Tyrrell, H. Haas, G. Auer, and P. Omiyi, "Decentralized Interference Avoidance Using Busiy Bursts," in Proc. Of IEEE International Conference on Communications (ICC 2007). Glasgow, UK: IEEE, Jun. 24-28, 2007.

(Continued)

*Primary Examiner* — Marceau Milord
(74) *Attorney, Agent, or Firm* — Nutter McClennen & Fish LLP; John J. Penny, Jr.; Christina M. Sperry

(57) ABSTRACT

A mobile transceiver apparatus being adapted for communicating radio signals from/to a base station transceiver. The mobile transceiver apparatus has a receiver module for receiving an information signal from an other base station transceiver, wherein the information signal being received with an information signal strength. The mobile transceiver apparatus further has a transmitter module for communicating a transmit radio signal with a transmit power to the base station transceiver, wherein the transmit power being dependent on the information signal strength received from the other base station transceiver.

8 Claims, 13 Drawing Sheets

U.S. PATENT DOCUMENTS

| | | | |
|---|---|---|---|
| 7,885,354 B2* | 2/2011 | Perlman et al. | 375/308 |
| 7,903,770 B2* | 3/2011 | Levin et al. | 375/346 |
| 8,005,046 B2* | 8/2011 | Salmenkaita et al. | 370/330 |
| 8,010,117 B1* | 8/2011 | Sigg et al. | 455/446 |
| 8,010,137 B2* | 8/2011 | Zeng et al. | 455/501 |
| 8,036,099 B2* | 10/2011 | Zangi et al. | 370/208 |
| 8,068,466 B2* | 11/2011 | Muharemovic et al. | 370/335 |
| 8,081,997 B2* | 12/2011 | Sambhwani et al. | 455/522 |
| 8,126,467 B2* | 2/2012 | Choi et al. | 455/444 |
| 8,160,631 B2* | 4/2012 | Raghothaman et al. | 455/522 |
| 8,170,081 B2* | 5/2012 | Forenza et al. | 375/141 |
| 8,184,596 B2* | 5/2012 | Karlsson et al. | 370/335 |
| 8,280,377 B2* | 10/2012 | Lee et al. | 455/436 |
| 2008/0043679 A1* | 2/2008 | Karlsson et al. | 370/335 |
| 2008/0107074 A1* | 5/2008 | Salmenkaita et al. | 370/330 |
| 2008/0166976 A1 | 7/2008 | Rao | |
| 2008/0188260 A1 | 8/2008 | Xiao et al. | |
| 2008/0214196 A1* | 9/2008 | Sambhwani et al. | 455/446 |
| 2008/0268888 A1* | 10/2008 | Chen et al. | 455/509 |
| 2009/0022110 A1* | 1/2009 | Muharemovic et al. | 370/336 |
| 2009/0238090 A1* | 9/2009 | Sambhwani et al. | 370/252 |

OTHER PUBLICATIONS

G. Auer, A. Tyrrell, and H. Haas, "Decentralized C/I Power Control for TDD," in Proc. Of the IEEE Vehicular Technology Conference (VTC). Marina Bay, Singapore: IEEE, May 11-14, 2008.

Z. Bharucha, I. 'Cosovic, H. Haas, and G. Auer, "Throughput Enhancement through Femto-Cell Deployment," in Proc. Of the 7th International Workshop on Multi-Carrier Systems & Solutions (MC-SS). Herrsching, Germany: IEEE, May 5-6, 2009.

V. Chandrasekhar, J. Andrews, and A. Gatherer, "Femtocell Networks: A Survey," IEEE Communications Magazine, vol. 46, No. 9, pp. 59-67, 2008.

H. Claussen, "Performance of Macro- and Co-Channel Femtocells in a Hierarchical Cell Structure," in Proc. of the 18th IEEE International Symposium on Personal, Indoor and Mobile Radio Communications (PIMRC), Athens, Greece, Sep. 3-7, 2007, pp. 1-5.

H. Claussen, L. Ho, and L. Samuel, "Self-Optimization of Coverage for Femtocell Deployments," in Proc. of the Wireless Telecommunications Symposium (WTS), Apr. 24-26, 2008, pp. 278-285.

L. Ho and H. Claussen, "Effects of User Deployed, Co-Channel Femtocells on the Call Drop Probability in a Residential Scenario," in Proc. of the 18th IEEE International Symposium on Personal, Indoor and Mobile Radio Communications (PIMRC), Athens, Greece, Sep. 3-7 2007, pp. 1-5.

P. Agyapong, H. Haas, A. Tyrrell, and G. Auer, "Interference Tolerance Signaling Using TDD Busy Tone Concept," in Proc. of the Vehicular Technology Conference (VTC). Dublin, Ireland: IEEE, Apr. 22-25, 2007, pp. 2850-2854.

Texas Instruments: "A Method for Uplink Open Loop Power Control".

Search Report mailed Jan. 18, 2010 in EP 09008637.2.

Japanese Office Action issued Oct. 12, 2011 for Application No. 2010-151010 (4 Pages) (English Translation).

* cited by examiner (STATE OF THE ART)

(STATE OF THE ART)

US 8,472,886 B2

MOBILE AND BASE STATION TRANSCEIVER APPARATUS FOR COMMUNICATING

CROSS-REFERENCE TO RELATED APPLICATIONS

This application claims priority from European Patent Application No. 09008637.2-2411, which was filed on Jul. 1, 2009, and is incorporated herein in its entirety by reference.

BACKGROUND OF THE INVENTION

The present invention is in the field of interference mitigation in wireless networks, as for example in cellular mobile communication networks.

Recently, much research has been done in the area of mitigating or avoiding interference in TDD (Time Division Duplex) networks by means of power control, cf. A. Tyrrell, H. Haas, G. Auer, and P. Omiyi, "Decentralized Interference Avoidance Using Busy Bursts," in *Proc. of IEEE International Conference on Communication (ICC 2007)*, Glasgow, UK: IEEE, Jun. 24-28, 2007 and G. Auer, A. Tyrrell, and H. Hass, "Decentralized C/I Power Control for TDD," in *Proc. of the IEEE Vehicular Technology Conference (VTC)*, Marina Bay, Singapore: IEEE, May 11-14, 2008. However, with increasing interest in LTE-A (Long Term Evolution-Advanced), TDD systems are migrating towards the adoption of OFDMA (Orthogonal Frequency Division Multiple Access).

As LTE-A also operates in FDD (Frequency Division Duplex) mode, where uplink and downlink are separated in different frequency bands, interference avoidance schemes applicable to FDD need to be devised. Unlike the TDD mode, FDD lacks channel reciprocity with respect to frequency selective fading, so that the interference mitigation techniques used in TDD systems are either not applicable for FDD or is to be modified in order to work properly.

UL (Uplink) interference is an area of great concern for future systems. As cell sizes shrink, the amount of interference in the UL increases. In traditional cellular systems, ideally, UL interference originates only from cells other than the cell of interest. However, with the promotion of the femto-cell concept, cf. Z. Bharucha, I. Ćosović, H. Haas, and G. Auer, "Throughput Enhancement through Femto-Cell Deployment," in *Proc. of the 7$^{th}$ International Workshop on Multi-Carrier Systems & Solutions (MC-SS)*, Herrsching, Germany: IEEE, May 5-6, 2009, V. Chandrasekhar, J. Andrews, and A. Gatherer, "Femtocell Networks: A. Survey," *IEEE Communications Magazine*, vol. 46, no. 9, pp. 59-67, 2008, H. Claussen, "Performance of Macro- and Co-Channel Femtocells in a Hierarchical Cell Structure," in *Proc. of the 18$^{th}$ IEEE International Symposium on Personal, Indoor and Mobile Radio Communications (PIMRC)*, Athens Greece, Sep. 3-7, 2007, pp. 1-5, H. Claussen, L. Ho, and L. Samuel, "Self-Optimization of Coverage for Femtocell Deployments," in *Proc. of the Wireless Telecommunications Symposium (WTS)*, Apr. 24-26, 2008, pp. 278-285, and L. Ho and H. Claussen, "Effects of User-Deployed, Co-Channel Femtocells on the Call Drop Probability in a Residential Scenario," in *Proc. of the 18$^{th}$ IEEE International Symposium on Personal, Indoor and Mobile Radio Communications (PIMRC)*, Athens, Greece, Sep. 3-7, 2007, pp. 1-5, this is not the case any more.

With the deployment of femto-cells, UL interference also comes from the macro-cell of interest since femto-cells will lie within macro-cells in an uncoordinated fashion. Maximising the capacity of such systems depends heavily on curtailing the UL interference caused at the BS (Base Station). This is dealt with in this work.

One previous proposal for interference tolerance signalling in TDD systems, cf. P. Agyapong, H. Haas, A. Tyrrell, and G. Auer, "Interference Tolerance Signaling Using TDD Busy Tone Concept," in *Proc. Of the Vehicular Technology Conference (VTC)*, Dublin, Ireland: IEEE, Apr. 22-25, 2007, pp. 2850-2854 may be of interest here. For an ongoing link, the maximum tolerable interference is established based on the signal-to-interference-plus-noise ratio (SINR) requirements of that link. Every potential interferer attempts to adjust its transmit power such that this level is not exceeded. Doing this establishes a "transmission region" around the BS. The lower the interference power, the larger is the transmission region.

FIGS. 12a and 12b illustrate an example of a network situation, in which interference mitigation is critical. In FIG. 12a on the left hand side there are two base stations B1 and B2. Furthermore, there are two mobile stations M1 and M2. M1 is actively communicating with B2, indicated by a solid arrow pointing from M1 to B2. While communicating M1 creates interference received at B1. Due to said interference, M2 cannot set up a connection to B1. M1 interferes with the uplink (UL) transmission of M2. From FIG. 12a it is seen that the uplink communication between B1 and M2 cannot take place because of the simultaneous and highly interfering uplink transmission between M1 and B2.

FIG. 12b illustrates the same situation, however, after M1 has reduced its transmission power due to SINR adjustments carried out or controlled by B2. After M1 having reduced its transmission power, the transmission region inflates to encompass the transmission between M2 and B1. In other words, the interferer adjusts its transmission power, thus allowing the vulnerable transmission to take place. By modulating the tolerable interference level, the size of the hearability distance, which is indicated in FIGS. 12a and 12b by the grey circle in the center of the respective cells or base stations, can be changed. From FIGS. 12a and 12b it can be seen that lowering the interference will increase the hearability distance and vice versa.

FIG. 13 illustrates the hearability distance with the help of a view graph. FIG. 13 shows the hearability distance around a base station, where the hearability distance is inversely proportional to the interfering power.

The above-described conventional concept however, has the disadvantage that uplink interference mitigation is carried out by the base stations, in terms of SINR adjustment. In case of time division duplex (TDD) systems, channel reciprocity is exploited, enabling to conclude between uplink and downlink channel coefficients. However, in a frequency division duplex (FDD) system, channel reciprocity between uplink and downlink is not present anymore.

SUMMARY

According to an embodiment a mobile transceiver apparatus being adapted for communicating radio signals from/to a base station transceiver, the mobile transceiver apparatus may have a receiver module for receiving an information signal from an other base station transceiver, the information signal being received with an information signal strength; and a transmitter module for communicating a transmit radio signal with a transmit power to the base station transceiver, the transmit power being dependent on the information signal strength received from the other base station transceiver.

According to another embodiment a method for communicating radio signals at a mobile transceiver from/to a base station transceiver may have the steps of receiving an information signal from an other base station transceiver, the information signal being received with an information signal strength; and communicating a transmit radio signal with a transmit power to the base station transceiver, the transmit power being dependent on the information signal strength received from the other base station transceiver.

According to another embodiment a base station transceiver apparatus being adapted for communicating radio signals to/from a mobile transceiver, wherein the base station transceiver apparatus may have a receiver module for receiving a receive signal from the mobile transceiver and for receiving an interference signal from an other mobile transceiver; a transmitter module for transmitting transmit signals to the mobile transceiver; a controller for determining an information on a tolerable interference level based on the received signal and the interference signal; an interface for communicating with an other base station transceiver and for providing the information on the tolerable interference level to the other base station transceiver.

According to another embodiment a method for communicating radio signals at a base station transceiver to/from a mobile transceiver may have the steps of receiving a receive signal from the mobile transceiver; receiving an interference signal from an other mobile transceiver; transmitting transmit signals to the mobile transceiver; determining an information on a tolerable interference level based on the received signal and the interference signal; communicating with an other base station transceiver; and providing the information on the tolerable interference level to the other base station transceiver.

According to another embodiment a computer program may have a program code for performing a method for communicating radio signals at a mobile transceiver from/to a base station transceiver, which may have the steps of receiving an information signal from an other base station transceiver, the information signal being received with an information signal strength; and communicating a transmit radio signal with a transmit power to the base station transceiver, the transmit power being dependent on the information signal strength received from the other base station transceiver; or a method for communicating radio signals at a base station transceiver to/from a mobile transceiver, which may have the steps of receiving a receive signal from the mobile transceiver; receiving an interference signal from an other mobile transceiver; transmitting transmit signals to the mobile transceiver; determining an information on a tolerable interference level based on the received signal and the interference signal; communicating with an other base station transceiver; and providing the information on the tolerable interference level to the other base station transceiver, when the computer program runs on a computer or processor.

According to another embodiment a system for communicating may have a plurality of base station transceiver apparatuses being adapted for communicating radio signals to/from a mobile transceiver, wherein the base station transceiver apparatus may have a receiver module for receiving a receive signal from the mobile transceiver and for receiving an interference signal from an other mobile transceiver; a transmitter module for transmitting transmit signals to the mobile transceiver; a controller for determining an information on a tolerable interference level based on the received signal and the interference signal; an interface for communicating with an other base station transceiver and for providing the information on the tolerable interference level to the other base station transceiver, wherein each of the base station transceiver apparatuses uses at least three frequency resources, each of which being assigned one out of at least three priority levels such that two adjacent base station transceiver apparatuses have different priority levels for different frequency resources.

The present invention is based on the finding that uplink interference mitigation can be based on information signals provided by vulnerable transceivers. In other words, it is a finding of the present invention that a mobile transceiver apparatus can contribute to uplink interference mitigation by overhearing signals of adjacent base station transceivers, to which it is not actively connected, by estimating a path loss to the respective vulnerable base station transceiver apparatus and by adjusting its own transmit power to said estimation.

Embodiments of the present invention can be particularly suited to networks with femto-cell deployment, where interference in the uplink can originate from the same macro-cell. One finding of the present invention is that the size of an exclusion region can be influenced by choosing the transmit power of a mobile transceiver apparatus properly. In other words, it is one finding of the present invention that the size of such an exclusion region is inversely proportional to the transmit power of a potential interferer. It is a further finding of the present invention that the transmit power of the interferer can be modified, in a way such that the interferer being located within the hearability region of a base station can continue to transmit without detrimentally affecting other ongoing transmissions. In other words, in embodiments an interference tolerance of a base station may be controlled by a received signal strength indicator (RSSI) received from the base station in the downlink.

Moreover, it is another finding of the present invention that priority masks can be used to control which one of a number of cells may transmit with maximum power to serve the cell-edge users, and which cells or base stations need to adjust their maximum transmit power. In embodiments, transmit power adjustments may be carried out on a per-resource block (RB) basis.

It is a further finding of the present invention that additional inter-base station signalling can be used to enhance uplink interference mitigation. Inter-base station signalling may enable power adjustment coordination in a way such that a certain SINR target or requirement is maintained at each active receiver.

Embodiments provide the advantage that means for interference coordination or mitigation are provided in a way such that fairness with regard to cell-edge users can be improved. Embodiments may therewith allow to more efficiently utilize spectral resources and therefore may enable cost reduction per transmitted bit.

Embodiments of the present invention may provide the advantage that interference tolerance techniques, which may have been previously designed for self-organizing TDD networks can also be adapted for uplink interference coordination in FDD systems. Moreover, embodiments of the present invention enable reduction of uplink interference through power adjustments in adjacent cells. Furthermore, embodiments may provide the advantage that the needed measurements are facilitated by exploitation of already existing information signals, as for example by reception of the RSSI on the downlink, which is already implemented in LTE (Long Term Evolution, 3GPP=$3^{rd}$ Generation Partnership Project).

Embodiments may provide the advantage that no additional control signalling between base stations is needed. Therewith, embodiments may already comply with existing standards, i.e. are therefore standard conformable and may be applied to existing standards such as LTE.

Further embodiments may be dynamic in that the interference is curtailed on a per-resource block basis, depending on the demands of users in the cell of interest. Embodiments may utilize soft-reuse power masks, which may specify a fixed and static maximum power allocation per resource block (RB). Embodiments may establish priority masks, which may only control which cells may transmit with maximum power and which cells need to adjust their transmit power based on the RSSI measurements.

BRIEF DESCRIPTION OF THE DRAWINGS

Embodiments of the present invention will be detailed using the accompanying figures, in which.

DETAILED DESCRIPTION OF THE INVENTION

Figure 1:
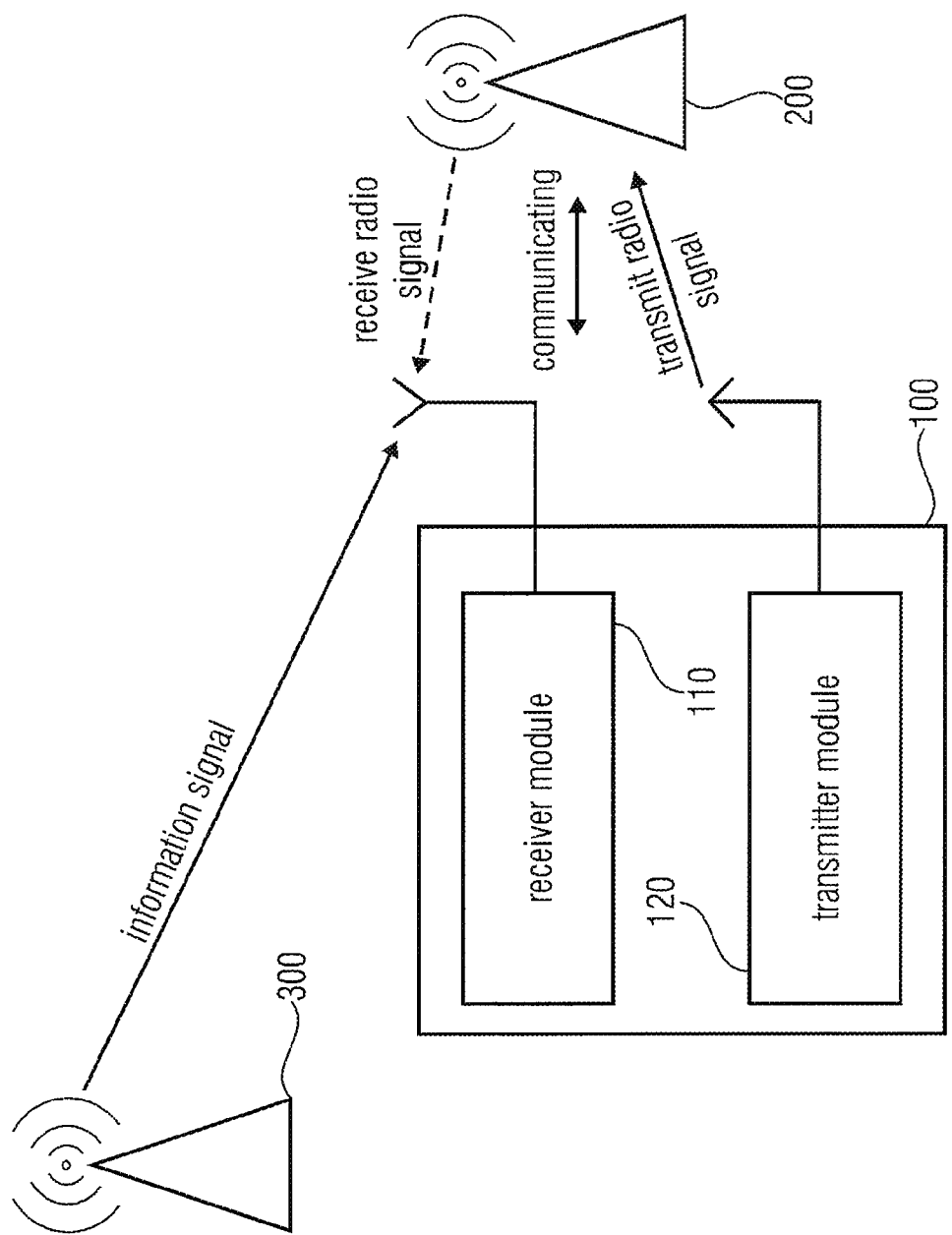
FIG. 1 shows an embodiment of a mobile transceiver apparatus.

FIG. 1 illustrates an embodiment of a mobile transceiver apparatus 100. FIG. 1 shows a scenario wherein the embodiment of the mobile transceiver apparatus 100, a base station transceiver 200 and an other base station transceiver 300 are involved. The mobile transceiver apparatus 100 is adapted for communicating radio signals from/to the base station transceiver 200. In other words, it is assumed that the mobile transceiver apparatus 100 has an active connection, i.e. a radio link established, a radio bearer set up, etc. to the base station transceiver 200.

The mobile transceiver apparatus 100 comprises a receiver module 110 for receiving an information signal from the other base station transceiver 300, the information signal being received with an information signal strength. Furthermore, the mobile transceiver apparatus 100 comprises a transmitter module 120 for communicating a transmit radio signal with a transmit power to the base station transceiver 200, the transmit power being dependent on the information signal strength received from the other base station transceiver 300.

In other words, as opposed to classical power control in cellular systems, where the adjustment of the transmit power of the uplink is targeted, embodiments may carry out power control aiming to maintain a given interference level of links in adjacent cells. In embodiments, information on the uplink interference induced to neighboring cells can, for example, be inferred on the downlink from the received signal strength indicator (RSSI), which is needed for handover measurements. In other words, the received information signal strength may correspond to a received information signal power and/or the received information signal may correspond to a received interference information from the other base station transceiver 300.

In some embodiments the RSSI may provide information regarding the path-gain between an interferer and a vulnerable transmitter. In some embodiments, further information about an active link may be forwarded to the interferer through the X2 interface and an according active base station transceiver 200, a potential interferer can therewith adjust its transmit power such that a certain SINR target is met at the vulnerable receiver.

In other words, in one embodiment, as for example in an LTE system, the RSSI may be used for the above-mentioned purpose. Generally, any information signal may be used. In some embodiments, the transmit power of the mobile transceiver apparatus 100 may be chosen as $$\hat{T}_i(f) \propto \frac{C(f)}{R_i^{RSSI}} \qquad (1)$$

where $R_i^{RSSI} = T^{RSSI} G_{i,v}$ is the received RSSI signal power, broadcast by $BS_v$ in an adjacent cell on the downlink. As the RSSI transmit power $T^{RSSI}$ is constant and known to all entities in the network, the channel gain between interferer i and receiving $BS_v$, $G_{i,v}$, can be determined by mobile i. As a strong RSSI implies that interferer i potentially causes high interference to $BS_v$ in an adjacent cell, as $BS_v$ is the transmitter of the RSSI in the downlink, there is an inverse relationship between maximum tolerable transmit power $\hat{T}_i(f)$ of mobile i and received RSSI from $BS_v$ in (1).

In other words, in embodiments the transceiver module 120 can be adapted for adapting a transmit power inversely proportional to the information signal strength and/or the receiver module 110 can be adapted for receiving a metric C, wherein the transceiver module 120 can be adapted for adapting the transmit power proportionally to the metric C. Moreover, in embodiments the metric C may be frequency dependent, i.e. C=C(f).

The frequency-dependent constant C(f) in (1) may be defined for every RB in the UL band, thus forming a power mask. The higher the value of C(f), the greater power the interferer can be allowed to transmit with, thus indicating that the tolerance for interference on that RB is high. Conversely, if the interference tolerance is low, C(f) may be set relatively low accordingly. To convey the requested information about C(f) to adjacent cells, an information exchange over the X2 interface may typically be needed. The properties of C(f) are elaborated further subsequently.

In the case of soft-frequency reuse, each macro-cell may transmit on a certain subband with high power and with reduced power on other subbands. In embodiments this may be predefined and fixed for every macro-cell, so that the shape of C(f) in this case may be fixed. In other embodiments the high interference indicator (HII) exchanged between BSs through the X2 interface may be used by base stations to broadcast which resource blocks are most vulnerable to interference. Usually these resource blocks are scheduled to cell-edge users. The shape of C(f) is determined according to the HII information for that macrocell.

Figure 3:
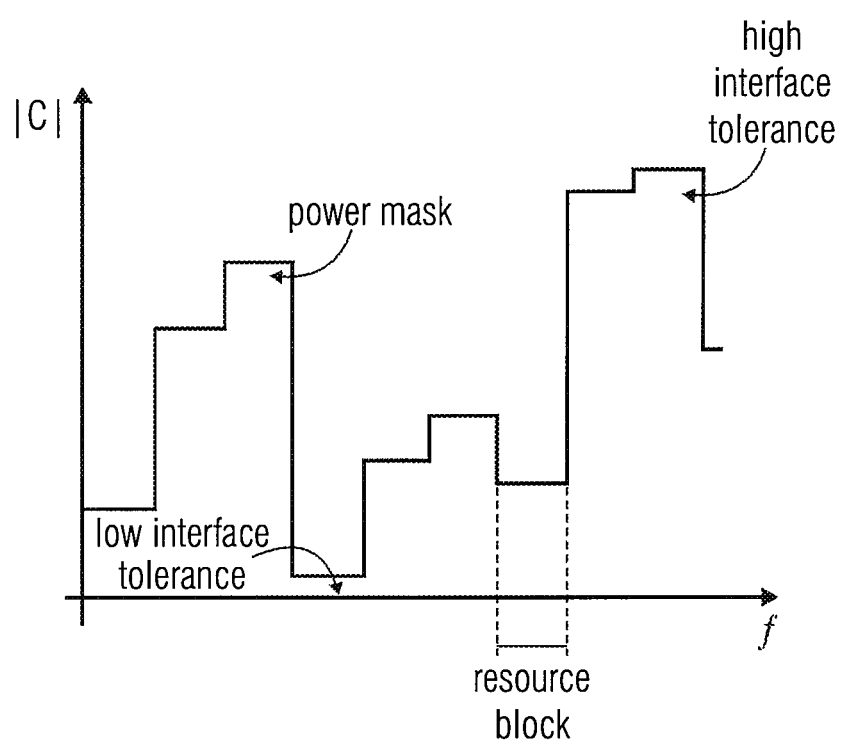
FIG. 3 shows an example of a frequency-dependent power mask.

FIG. 3 illustrates an example of the metric C(f), i.e. and example of a power mask. In FIG. 3 it can be seen that C is dependent on the frequency, where low magnitudes of C correspond to a low interference tolerance and high magnitudes of C correspond to high interference tolerances.

Unlike TDD systems, channel reciprocity is not maintained in FDD systems. Therefore, in embodiments, the receiver module 110 can be adapted for receiving the information signal on a reception frequency and the transmitter module 120 can be adapted for transmitting the transmit signal on a transmission frequency, wherein the reception frequency is different from the transmission frequency. In these cases, a fading margin may be considered in embodiments, since only path loss and shadowing are reciprocal for FDD systems. In other words, in embodiments the transmitter module 120 can be adapted for basing the transmit power further on a fading margin. In embodiments this may be carried out by adjusting C(f) if the vulnerable BS experiences interference from multiple sources. Therefore, in embodiments the transmit power used by a potential interferer may be changed to $$\hat{T}_i(f) \propto \frac{C(f)}{R_i^{RSSI}} \times M_{FDD} \quad (2)$$

where $M_{FDD} \leq 1$ is the margin introduced due to the non-reciprocal fading component inherent in FDD systems.

In embodiments the transmit power of each potential interferer, i.e. mobile transceiver apparatus 100, may be adjusted so as not to disturb existing links, i.e. other active communication links. As already described above, in an embodiment the RSSI on the downlink band is used as an indicator of the level of interference caused to a vulnerable base station 300.

Figure 4B:
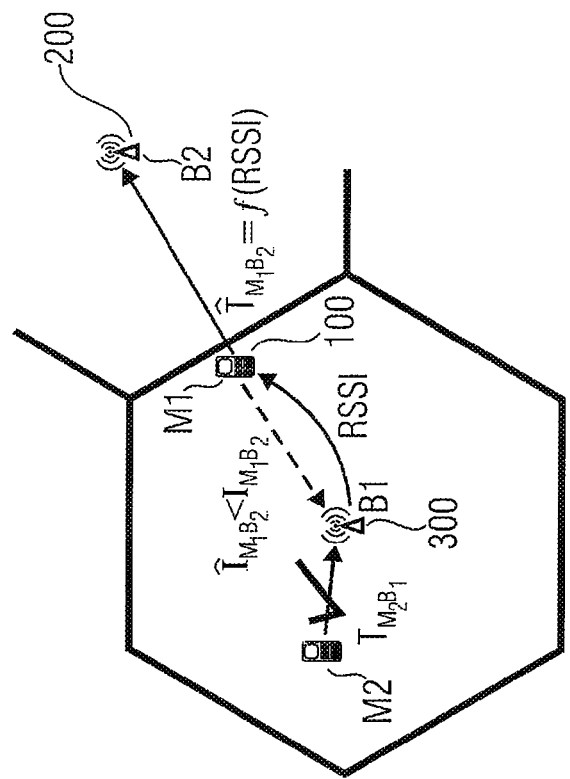
FIGS. 4a,4b illustrate an embodiment in a network scenario, wherein the interferer is enabled to adjust its transmit power based on the RSSI measurement from the vulnerable base station.
Figure 4A:
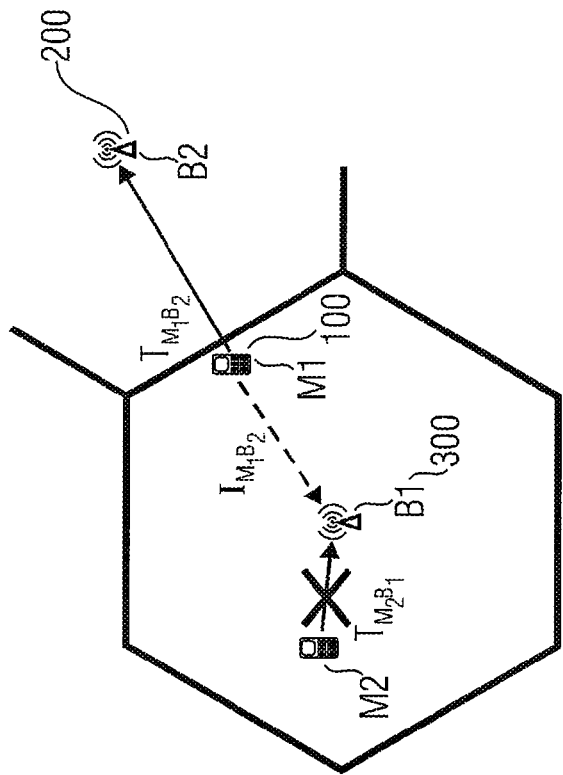

FIGS. 4a and 4b illustrate such an embodiment in a network scenario. FIGS. 4a and 4b show an embodiment of the mobile transceiver apparatus 100 also labelled M1. Moreover, an embodiment of the base station transceiver apparatus 200 is shown, also labelled B2, as well as the other transceiver base station 300, which is also labelled B1. FIG. 4a on the left-hand side indicates by the dotted arrow that M1 interferes with the uplink transmissions of M2, which is an other mobile transceiver.

In both FIGS. 4a and 4b it is assumed that the mobile stations or mobile transceivers M1 and M2 both have been assigned the same frequency resources. As can be seen in the figs., M1 is served by B2, whereas M2 shall be served by B1. As M1 is located in the cell-edge area, it interferes with B1 thus preventing the transmission between M2 and D1 from taking place as indicated in FIG. 4a. As indicated in FIG. 4b, M1 is capable of receiving the RSSI from B1, which indicates the power level received by B1 on this frequency resource. Based on this information, the embodiment of the transceiver apparatus 100 M1 reduces its transmit power such that the uplink transmission from M2 can still happen. In other words, M1 adjusts its transmission power based on the RSSI received as information signal from B1, i.e. the vulnerable base station.

The adjusted transmit power ($\hat{T}$) can be inversely proportional to the RSSI such that if the RSSI is high, the interferer reduces its transmit power and vice-versa $$\hat{T}_i \propto \frac{1}{R_i^{RSSI}}. \quad (3)$$

So, compared to (1) the variable C(f) is simply set to 1. It can be seen that $\hat{T}_i$ is typically not frequency dependent, as the possible frequency dependence of $R_i^{RSSI}$ is typically averaged out. This is because in FDD channel reciprocity may only hold for path-loss and shadowing, which are in general not frequency dependent. For FDD a fading margin $M_{FDD}$ may also be introduced.

Figure 5B:
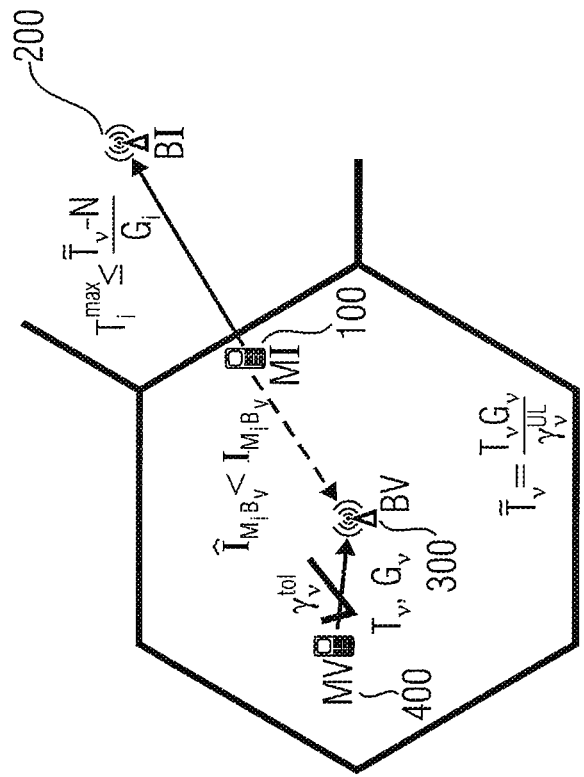
FIGS. 5a,5b illustrate another embodiment wherein an interferer is enabled to adjust its transmit power based on an RSSI measurement from a vulnerable base station enhanced through additional inter-base station signalling.
Figure 5A:
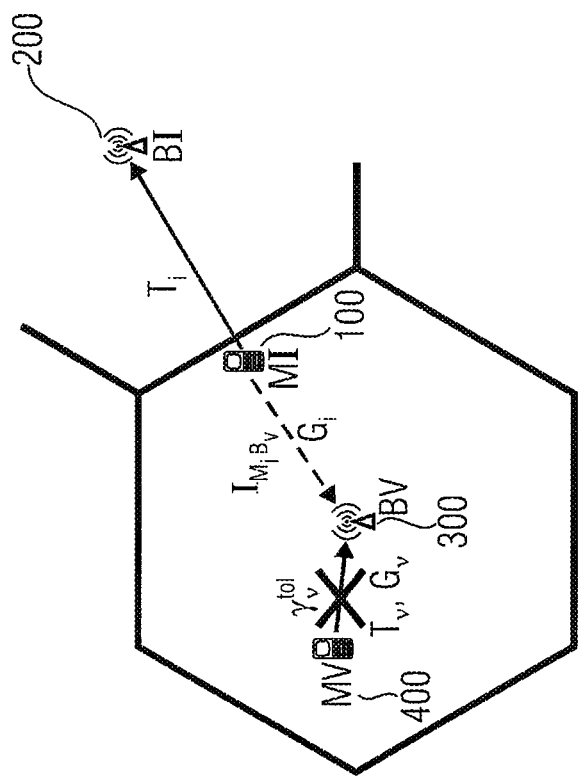

Equation (3), however, does not take into account the interference requirements on a particular resource block (RB). For example, there may exist scenarios, where a vulnerable RB is used for data traffic with high SINR requirement or in other scenarios, where the network is very lightly loaded, only a minimum SINR requirement may exist, since in this condition, the network or the vulnerable base station is more tolerant to interference. In order to take into account such additional constraint, the power mask C(f) in (1) can be appropriately modified in the following. Therefore, FIGS. 5a and 5b illustrate another scenario where an interfering mobile transceiver MI 100 is communicating with the corresponding base station transceiver 200, namely BI. The other base station transceiver 300 is labelled BV, the corresponding vulnerable mobile transceiver accordingly MV. From FIG. 5a it can be seen that MI interferes with the uplink transmission of MV. In the following it will be explained how MI adjusts its transmission power based on the received information signal strength and the metric C(f).

Figure 2:
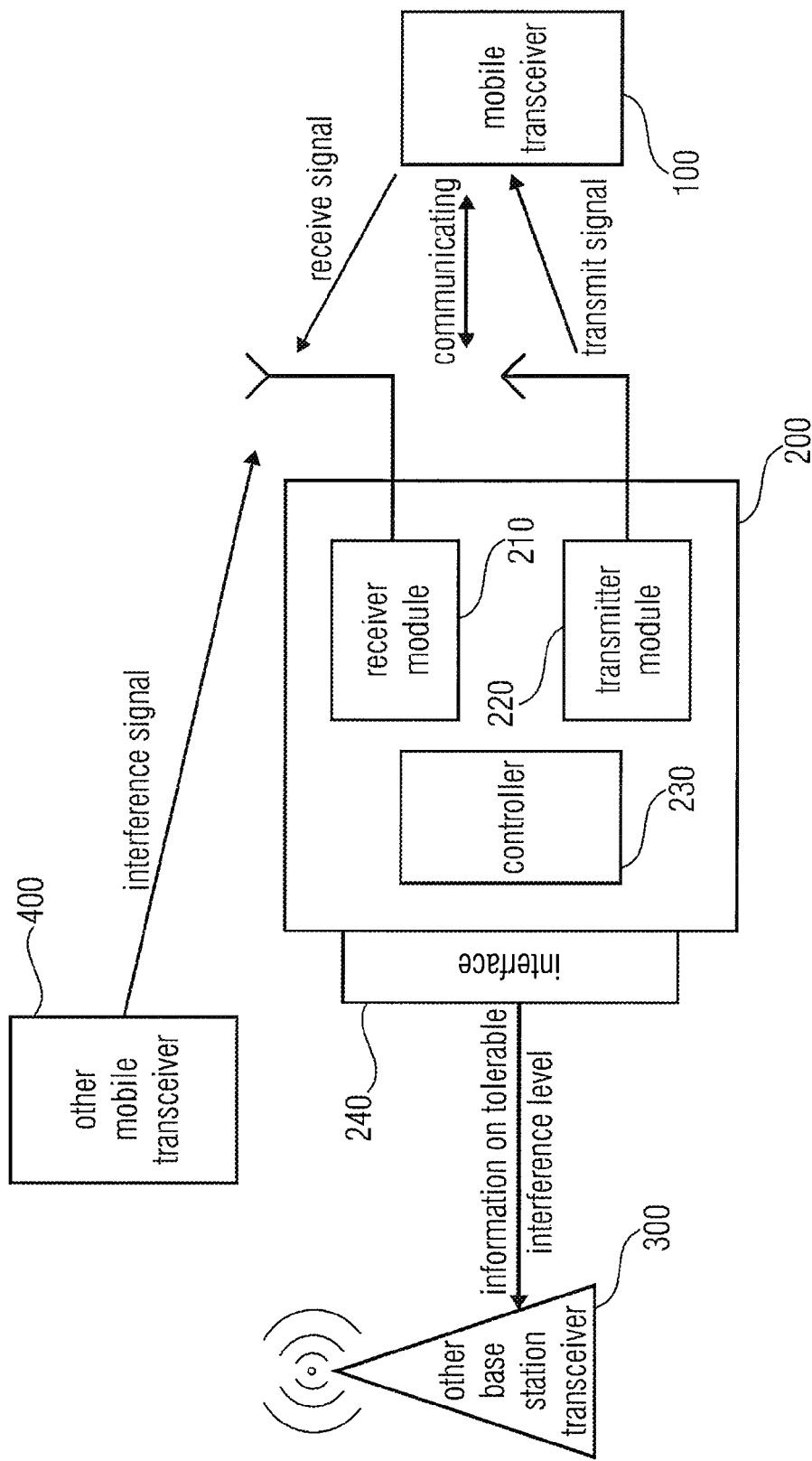
FIG. 2 shows an embodiment of a base station transceiver apparatus.

In order to do so, it is to be noted that according to some embodiments, the base station transceiver apparatus 200 is adapted for communicating radio signals to/from the mobile transceiver 100. Details of an embodiment of the base station transceiver 200 are illustrated in FIG. 2. In FIG. 2 it can be seen that the base station transceiver apparatus 200 comprises a receiver module 210 for receiving a receive signal from the mobile transceiver 100 and for receiving an interference signal from another mobile transceiver 400. Referring back to the network scenario illustrated in FIGS. 5a and 5b, the other mobile transceiver 400 corresponds to MV.

As can be seen from FIG. 2, the base station transceiver apparatus 200 further comprises a transmitter module 220 for transmitting transmit signals to the mobile transceiver 100 and a controller 230 for determining an information on a tolerable interference level based on the received signal and the interference signal. Furthermore, the base station transceiver apparatus 200 comprises an interface 240 for communicating with the other base station transceiver 300 and for providing the information on a tolerable interference level to the other base station transceiver 300.

In embodiments of the base station transceiver apparatus 200, the interface 240 can be adapted for receiving another information on a tolerable interference level from the other base station transceiver 300. Furthermore, the transmitter module 220 can be adapted for transmitting the other information on the tolerable interference level to the mobile transceiver 100. In embodiments of an LTE system, the interface 240 may correspond to the X2 interface. In further embodiments, the information on the tolerable interference level may refer to one of a plurality of frequency resources and/or each of the plurality of frequency resources may have assigned a priority or priority level.

In other words, embodiments of the base station transceiver 200 can be adapted for exchanging information on a tolerable interference level among each other. Some embodiments may therefore be used utilizing state of the art power control with the mobile transceiver apparatus assigned, however, taking into account the information on the tolerable interference levels from the adjacent base station transceivers. In other words, it is one embodiment to exchange such information on tolerable interference levels between adjacent base station transceivers so to enable effective radio resource management, for example in terms of frequency resource management.

One embodiment of the base station transceiver apparatus 200 may be provided with information on a tolerable interference level of an adjacent base station transceiver apparatus. In embodiments said base station transceiver apparatus 200 may reconfigure frequency resources for cell-edge users based on the information on the tolerable interference level provided by the adjacent base station transceiver. Effective frequency resource assignment may be carried out based on priorities, which are assigned to different frequency resources between adjacent base station transceivers. In other words, a cell-edge mobile transceiver assigned to a first base station may be assigned a high priority frequency resource, knowing that cell-edge mobile transceivers from the adjacent base stations will have assigned a high priority frequency resource, which is different. Therewith, effective interference mitigation is carried out.

Coming back to FIGS. 5a and 5b, interference mitigation may be carried out according to the following description. Consider a vulnerable UL transmission taking place between a MS (MV) and BS (BV). Another (interfering) UL transmission is taking place in parallel and using the same resources between the MS-BS pair MI and BI, such that the transmission from MI interferes at BV as seen in FIG. 5a. Let $T_v$ and $G_v$ be the transmit power and channel gain respectively for MV. For this UL transmission, let $I_v^{tol}$ be the maximum acceptable interference. If the thermal noise in the system is defined as N, then the lowest tolerable SINR for this link is given as $$\gamma_v^{tol} = \frac{T_v G_v}{I_v^{tol} + N}. \quad (4)$$

Rearranging (4), the tolerable interference can be represented as $$I_v^{tol} = \frac{T_v G_v}{\gamma_v^{tol}} - N. \quad (5)$$

Now, if MI is the only interferer, its transmit power can be represented using $I_v^{tol}$ as $$\hat{T}_i \leq \frac{I_v^{tol}}{G_{iv}} \quad (6)$$

where the channel gain between BV and MI, $G_{iv}$, can be inferred using the RSSI indicator. The transmission power of the RSSI indicator is fixed and known. Therefore, the received power of the RSSI indication transmission can be used to calculate $G_{iv}$ as $$G_{iv} = \frac{R_i^{RSSI}}{T^{RSSI}}. \quad (7)$$

Using (5) in (6) yields $$\hat{T}_i \leq \frac{T_v G_v}{\gamma_v^{tol} G_{iv}} - \frac{N}{G_{iv}} \quad (8)$$

as the solution for the maximum transmit power of MI that maintains the minimum SINR of $\gamma_v^{tol}$ at BV.

Comparing (8) with (1) yields the value of the frequency dependent power mask as $$C(f) = T^{RSSI} \cdot \left( \frac{T_v G_v}{\gamma_v^{tol}} - N \right). \quad (9)$$

The quantity $$\tilde{T}_v = \frac{T_v G_v}{\gamma_v^{tol}}$$

can be readily determined by the BS BV since the channel gain $G_v$, the transmission power $T_v$ and the SINR $\gamma_v^{tol}$ are known at BV. In order for this scheme to work properly, every potential interferer needs to be aware of the metric C(f). The X2 interface can be used to distribute C(f) to neighboring BSs, which can then broadcast it to their associated MSs.

In the following, the embodiments wherein the transmit power of the mobile transceiver apparatus 110 is adjusted solely based on the RSSI from the vulnerable base station transceiver 200 is also referred to as proposal A. The other embodiments, where the base station transceiver apparatus 200 provides an information on a tolerable interference level to an other base station transceiver 300, for example using the X2 interface, is referred to as proposal B.

One potential problem of the uplink interference protection scheme described above is that transmit powers in adjacent cells may be iteratively reduced. This is because mobile i in cell I adjusts its transmit power relative to the RSSI received from cell V, and vice versa. This means that mobile i in cell I and mobile v in cell V both could reduce their transmit powers, so that most likely the SINR target is not met in both cells. To avoid this problem the concept of priority masks is introduced for some embodiments, where a certain cell group is given priority over adjacent cells. Then, one cell is guaranteed to transmit with maximum power on a certain RB, so that the cell is able to serve its cell-edge users, which typically has to use high transmit powers to be able to communicate.

Figure 6:
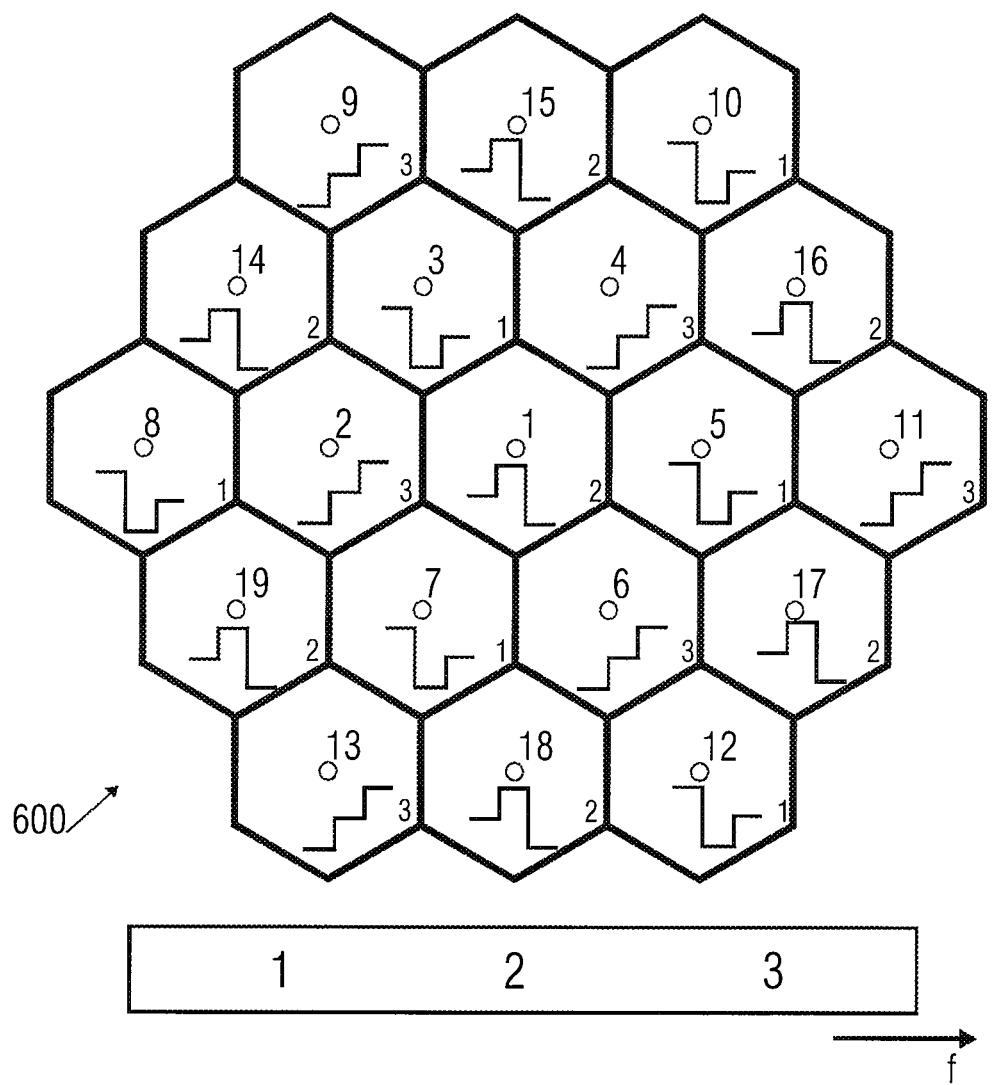
FIG. 6 shows an embodiment of a soft-frequency reuse pattern among base stations.

FIG. 6 illustrates an embodiment of a system using soft-frequency reuse. FIG. 6 illustrates a number of cells or base station transceivers 200, having assigned different priorities to different frequency resources. In other words, FIG. 6 shows a plurality of base station transceiver apparatuses 200 according to the above description, wherein a tolerable interference level refers to one of a plurality of frequency resources, in FIG. 6 exemplified as three frequency resources, and/or wherein each of the plurality of frequency resources has assigned a priority or priority level. FIG. 6 shows a system 600, which comprises 19 base station transceivers 200, which are sequentially labelled or numbered.

The system 600 comprises a plurality of base station transceiver apparatuses 200 according to the above description, wherein each of the base station transceiver apparatuses 200 uses at least three frequency resources, each of which being assigned one out of at least 3 priority levels such that two adjacent base station transceiver apparatuses 200 have different priority levels for different frequency resources. This is indicated by the numbers 1, 2 and 3 located at the lower right corner of each of the coverage areas of the base station transceiver apparatuses 200 as indicated in FIG. 6. The base station transceiver apparatuses 200, which are labelled by 1 in the lower right corner have the highest priority for the first frequency resource, the lowest priority on the second frequency resource and a medium priority on the third frequency resource, which is indicated by the small view graph below the center of each base station transceiver apparatus' coverage area.

Furthermore, each of the base station transceiver apparatuses 200 having a 2 located at the lower right corner of the coverage area have the medium priority for the first frequency resource, the highest priority for the second frequency resource, and the lowest priority for the third frequency resource. Consequently, the base station transceiver apparatuses 200 having a 3 located at the lower right corner of the coverage area has the lowest priority for the first frequency resource, the medium priority for the second frequency resource and highest priority for the third frequency resource. In embodiments a frequency resource may correspond to one or a number of subcarriers from an OFDMA system. As can be seen from FIG. 6, adjacent base station transceiver apparatuses 200 have assigned different priorities for different frequency resources.

Consequently, embodiments of the mobile transceiver apparatus 100 may comprise a receiver module 110, which is adapted for receiving an information on a priority per frequency resource and they may further comprise a transmitter module 120, which is adapted for adapting the transmit power dependent on the priority of the frequency resource used to transmit the transmit signal.

For the proposed embodiments using priority masks, the entire frequency band may be divided into three sub-bands, similar to the soft-frequency reuse concept. Cell-edge users can be scheduled resources with high priority, i.e. resources where they are allowed to transmit with full power. In the remaining sub-bands, the transmit powers may be adjusted according to either of the above-described embodiments according to proposal A or B. For example, from FIG. 6, it is seen that cell 1 transmits with full power on sub-band 2, where the sub-bands with high priority are also indicated by the colour coding. Therefore, the cell-edge users in cell 1 can be allocated resources from the second sub-band. Similarly, in cell 2, the cell-edge users are allocated resources from sub-band 3. Such a sub-band, one with full transmit power, is henceforth known as and referred to as the high priority sub-band. Cell-centre users can be allocated resources from the other two sub-bands. Unlike conventional soft-reuse, where a certain maximum transmit power is specified, each sub-band can be assigned a priority level. The following clarifies the use of the priority levels.

In the following, two embodiments will be illuminated in order to clarify the use of the priority levels. As the first case or embodiment, assume the case when two users in different cells, using the same resource, cause detrimental interference to one another. If, for one of the users, this resource is in the high priority sub-band, then this user continues to transmit with high power. In this case, the other user may reduce its transmit power according to the proposals, so as to reduce the interference caused by it to the other user. As an example, assume that a user in cell 1 and another one in cell 5 use the same resource from the second sub-band. For cell 1, this is a high priority resource, whereas it is not for cell 5. Therefore, the user in cell 5 may lower its transmit power for this resource.

As the second case or another embodiment, let a user in cell 1 be assigned a particular resource in the third sub-band and another user in cell 5 be assigned the same resource. Further, both users cause detrimental interference to one another. Neither of the cells has the third sub-band as their high priority sub-band. However, in embodiments there may be defined a second-priority pattern in the system. According to this, as can be seen in FIG. 6, the third sub-band in cell 1 has higher second priority than cell 5, where the discontinuous line represents the priority level for each sub-band. Therefore, in order to avoid the undesirable ping-pong effect where both the users successively reduce their transmit power in order to achieve an SINR target, only the user in cell 5 reduces its transmit power because the resource in cell 5 has lower priority than in cell 1.

Since both, the high priority and second priority sub-bands are distributed with the same reuse pattern, it is ensured that the same priority is separated by one tier or layer of cells. In other words, for any given sub-band, two adjacent cells will have a disparity in priority levels to resolve the unwanted ping-pong effect.

The proposed priority masks also fit into embodiments using the concept of femto-cell deployments that share the frequency resources with cellular macro-cells. Since the macro-cells are needed to provide coverage, they are typically given priority over femto-cells. In the context of the proposed UL interference protection scheme, macro-cells may transmit with full power, while femto-cells need to comply their transmit powers to the macro-cell RSSI signals.

In the following, the $m^{th}$ RB belonging to the $n^{th}$ user in cell o is represented by $RB_{m,n}^{o}$ and $RSSI_p^q$ is the received signal strength indicator power received by user p from cell q. The following pseudo-code shall illuminate a simulation flow for embodiments using proposal B.

```
Input: Initialised system with soft-frequency reuse
Output: System with reduced transmit powers as per proposals
foreach Cell i do
    foreach User j in Cell i do
        foreach RB k of User j do
            if SINR of RB^i_{k,j} > threshold then
                continue;
            else
                foreach Cell l (l ≠ i) do
                    identify user x using RB k;
                    if (priority RB^l_{x,k} < priority RB^i_{k,j})
                    && (RSSI^l_x/N > threshold) then
                        reduce power according to
                        proposal/embodiment;
                    else
                        continue;
                    end
                end
            end
        end
    end
end
```

Figure 7:
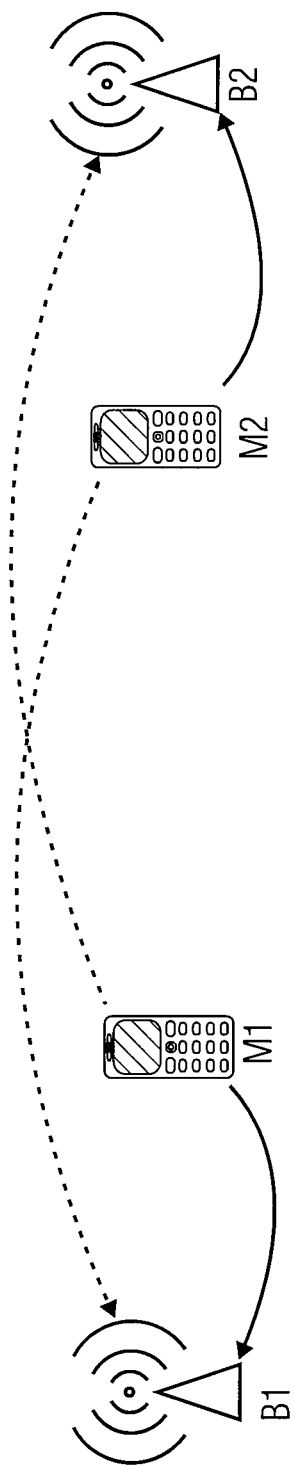
FIG. 7 illustrates a simulation scenario.

FIG. 7 illustrates a simulation scenario, where two base station transceivers B1 and B2 are assumed. To each of the two base station transceivers one mobile transceiver apparatus is assigned, i.e. M1 is assigned to B1 and M2 is assigned to B2.

A two-link study is carried out to assess the performance of embodiments of the two interference protection techniques. Two base stations are considered, each of which is associated with one mobile station. The base stations and mobile stations are placed on a straight line. Each of the mobile stations is moved closer to and away from its associated base station cf. FIG. 7. Each mobile is "assigned" the same resource block such that both transmissions interfere with one another. The achieved SINRs for each mobile are observed for the different schemes.

In the benchmark system, the sum system capacity is recorded for the different positions of the two mobile stations. Soft reuse is assumed such that M1 is considered to have higher priority than M2. Therefore, M1 transmits with 1 W and M2 transmits with 0.25 W.

For embodiments using proposal A, M2 reduces its transmit power based on the RSSI received by it from B1. Therefore, the new transmit power for a user i ($P_i^{new}$) can be calculated as $$P_i^{new} = \min\left(\frac{P_i^{curr}}{RSSI} \times N \times N_{off}, P_i^{curr}\right), \quad (10)$$

where $P_i^{curr}$ is the transmit power of user i at initialisation, RSSI represents the RSSI signal received from B1, N is the thermal noise and $N_{off}$ is an offset that prevents only very distant users from maintaining their current transmit powers. In this case, soft-reuse is not considered, i.e., both mobiles can potentially transmit with 1 W. However, M1 is still assumed to have priority, which is why only M2 adjusts its transmit power. Furthermore, $N_{off}$ is adjusted so that M1 achieves an SINR of 10 dB in the worst case, i.e., when both mobiles are farthest from their respective base stations.

For the embodiments using proposal B, again it is assumed that M1 has priority over M2. Therefore, if the SINR target at B1 is not met, M2 reduces its transmit power using the tolerable interference calculated at B1. The tolerable interference at B1 is calculated as $$I_{B1}^{tol} = \frac{T_{M1} G_{B1}}{\gamma^{tol}} - N, \quad (11)$$

where $T_{M1}$ is the transmit power of M1, $G_{B1}$ is the gain between M1 and B1, $\gamma^{tol}$ is the pre-defined SINR requirement and N is the thermal noise. Based on (11), the transmit power of M2 can be calculated as $$P_{M2}^{new} = \min\left(\frac{I_{B1}^{tol}}{G_{M2B1}}, P_{M2}^{curr}\right), \quad (12)$$

where $G_{M2B1}$ is the gain between M2 and B1.

The parameters used for the simulation of the embodiments are shown in the following table:

| SIMULATION PARAMETERS | |
| --- | --- |
| Parameter | Value |
| RB bandwidth | 100 kHz |
| Thermal Noise | −144 dBm |
| Inter-site distance | 400 m |
| Noise offset $N_{off}$ for prop. A (adjusted for 10 dB SINR at edge) | ≈46.17 dB |
| SINR requirement $\gamma^{tol}$ for prop. B | 10 dB |
| Minimum SINR requirement for M2 to transmit in proposals A & B | 2.2 dB |

Figure 8:
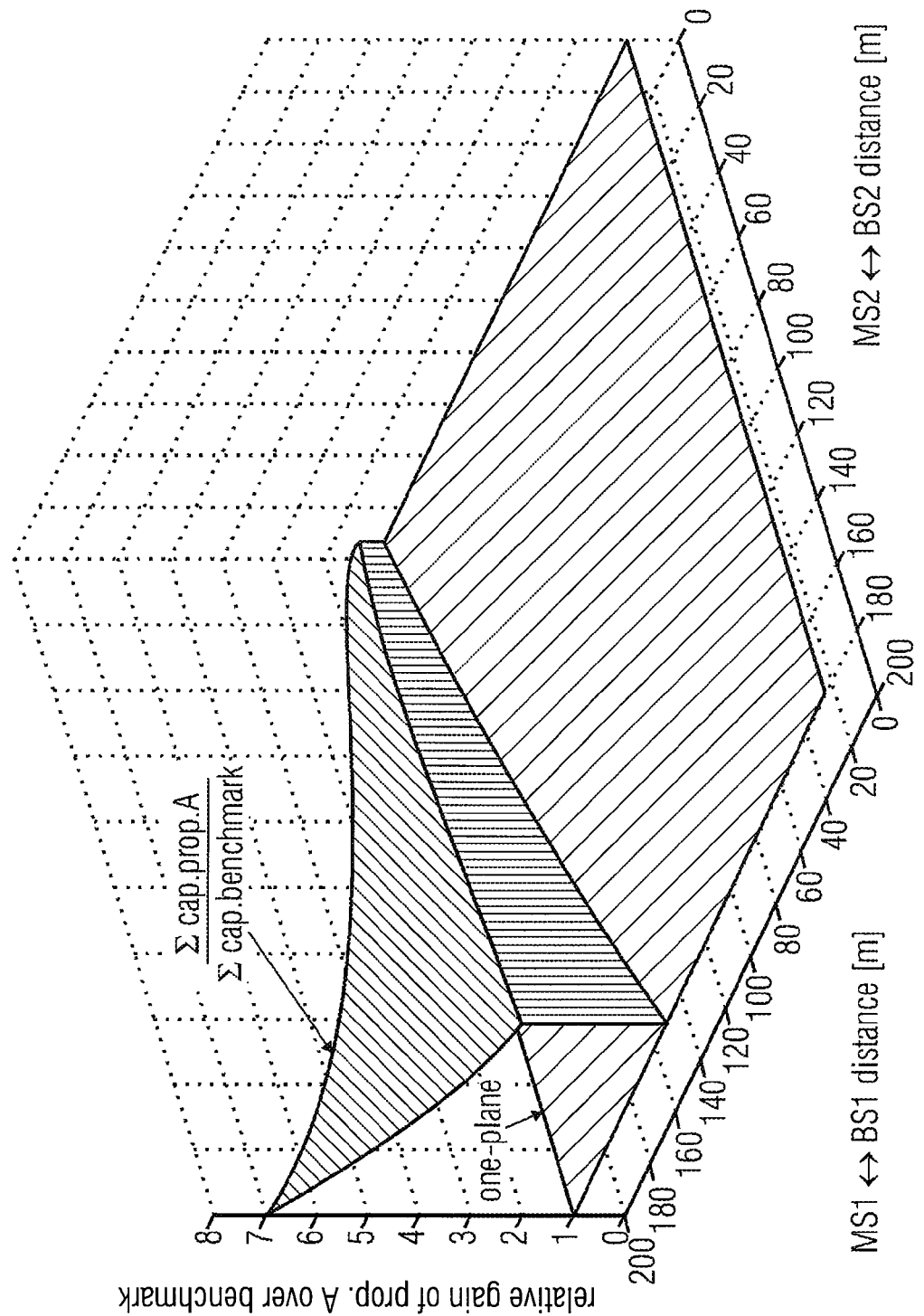
FIG. 8 illustrates simulation results of an embodiment.

In the following simulation results will be presented with the help of FIGS. 8, 9, 10 and 11. The three figures show 3-dimensional view graphs, where the distance between M1 and B1 is given on a first axis, the distance between M2 and B2 is given on a second axis. FIGS. 8 and 10 display the relative gain over the bench mark system, which will be detailed in the following, FIGS. 9 and 11 display the SINR achieved at B1 for the two proposals A and B.

FIG. 8 shows the relative gain of proposal A over soft reuse. In this case, M2 shuts itself off, when an SINR of 2.2 dB or above cannot be sustained at B2. It can be seen here that the surface is comprised of two sections. The section, where the relative gain abruptly increases corresponds to the set of locations for M2, where it does not transmit. It is well known that in a two link situation, if one of the links does not transmit, sum capacity is maximised. Due to this phenomenon, the sum capacity is high in this region. In the other region, M2 is still transmitting, however it is made to adjust its power as described above.

Figure 9:
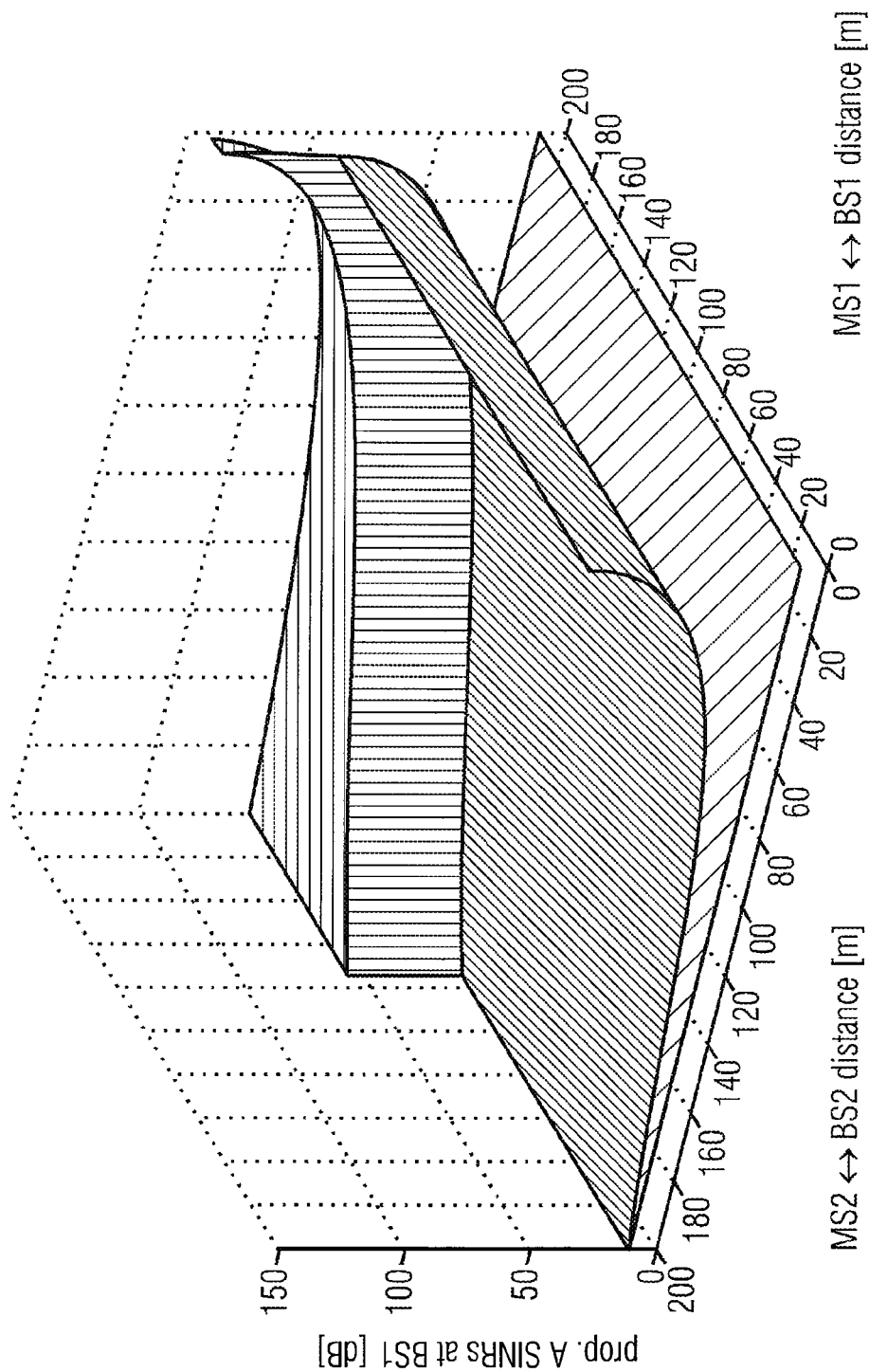
FIG. 9 illustrates simulation results of an embodiment.
Figure 10:
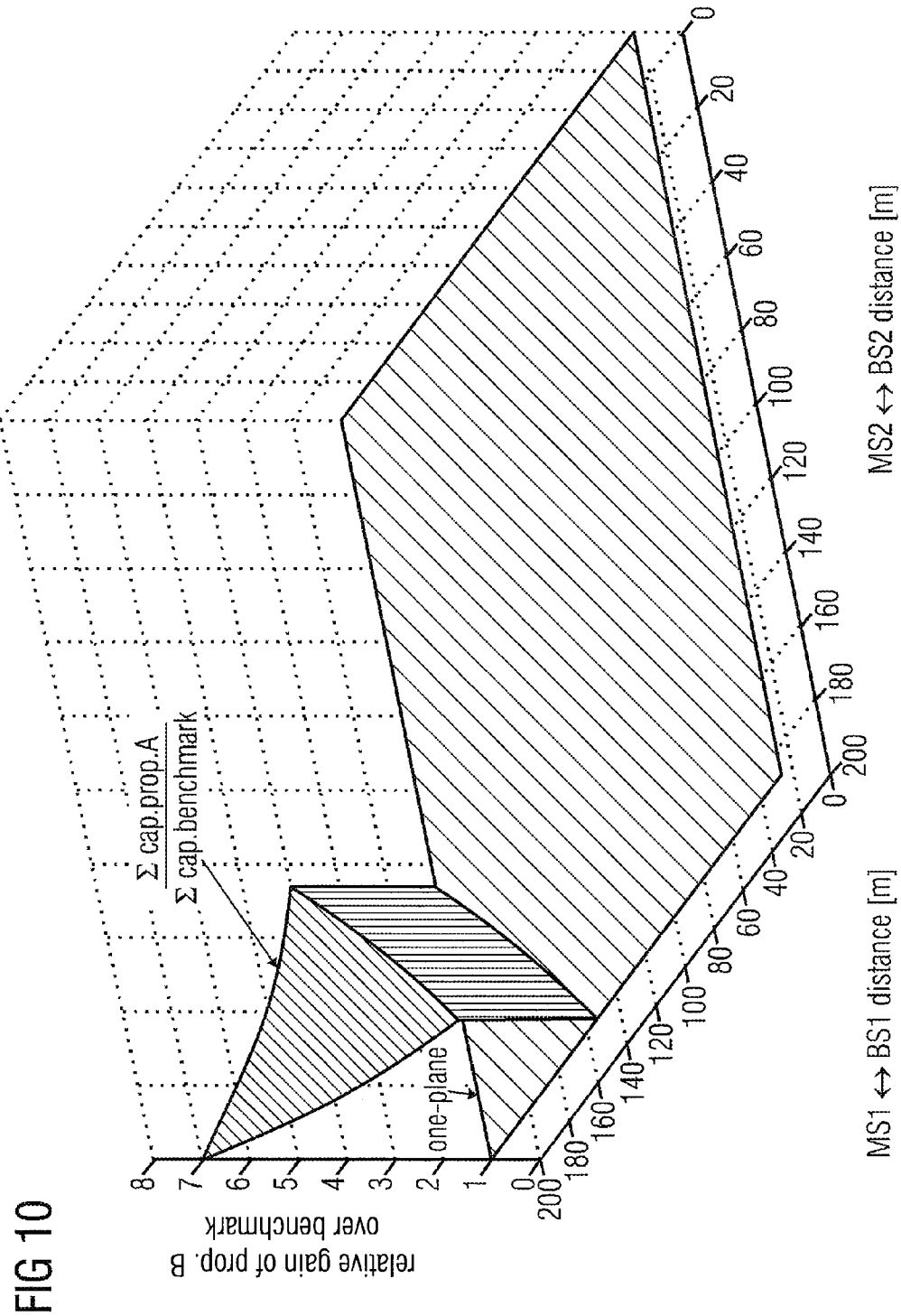
FIG. 10 illustrates simulation results of an embodiment.

FIG. 9 shows the SINRs achieved at B1 for proposal A. Since $N_{off}$ is adjusted for an SINR of 10 dB in the worst case, it is seen that the SINR never falls below this value.

FIG. 10 shows the relative gain of proposal B over soft reuse. Like FIG. 9, the surface shown in this figure comprises of two sections. The section showing a high capacity gain is the section where M2 is switched off due to poor achieved SINR at B2. In the other section, M2 reduces its transmit power so that the SINR target may be achieved at B1.

Figure 11:
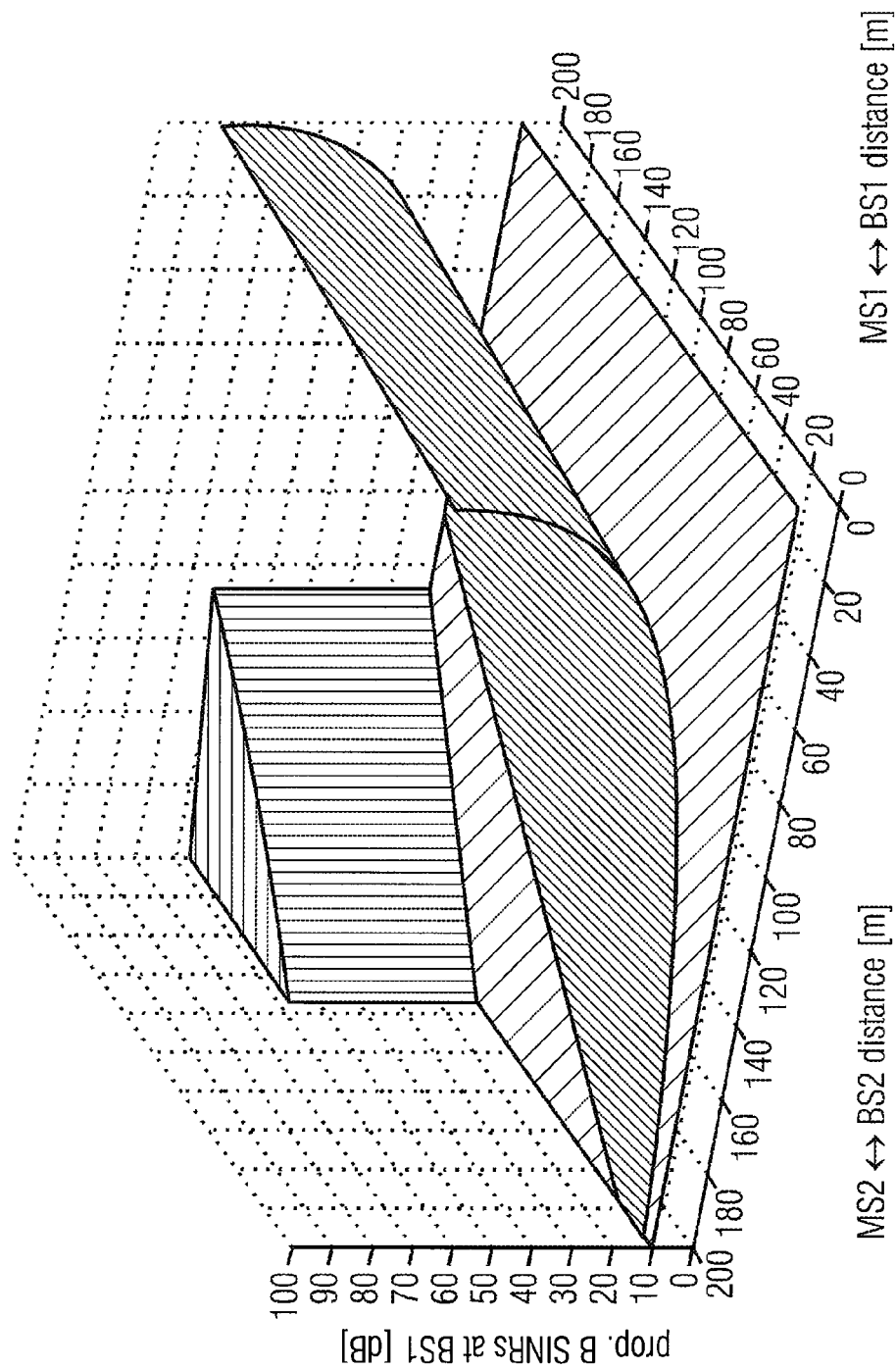
FIG. 11 illustrates simulation results of an embodiment.
Figure 12A:
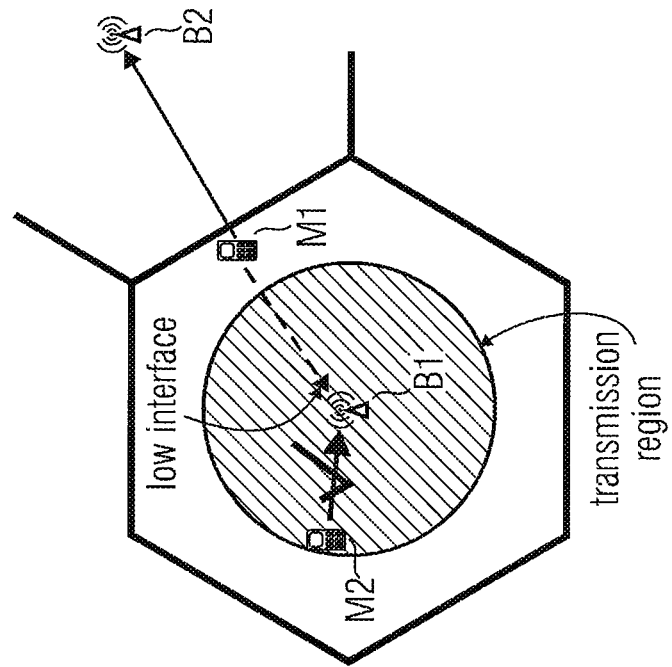
FIGS. 12a,12b illustrate a state of the art concept for uplink interference mitigation in TDD.
Figure 12B:
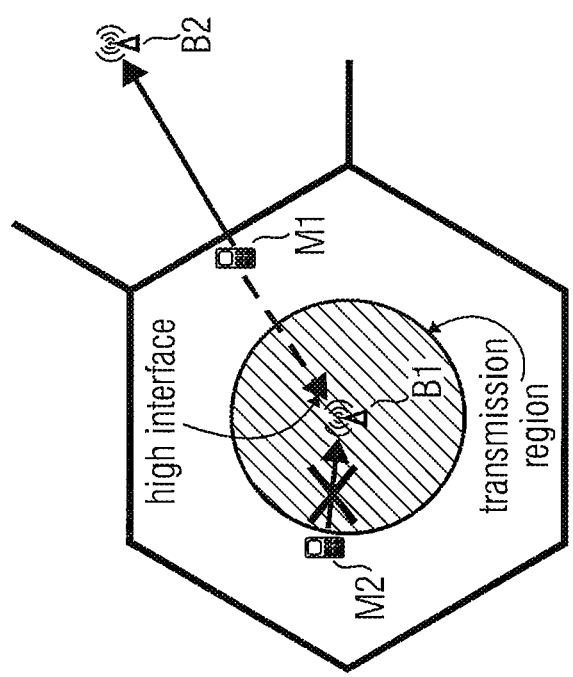
Figure 13:
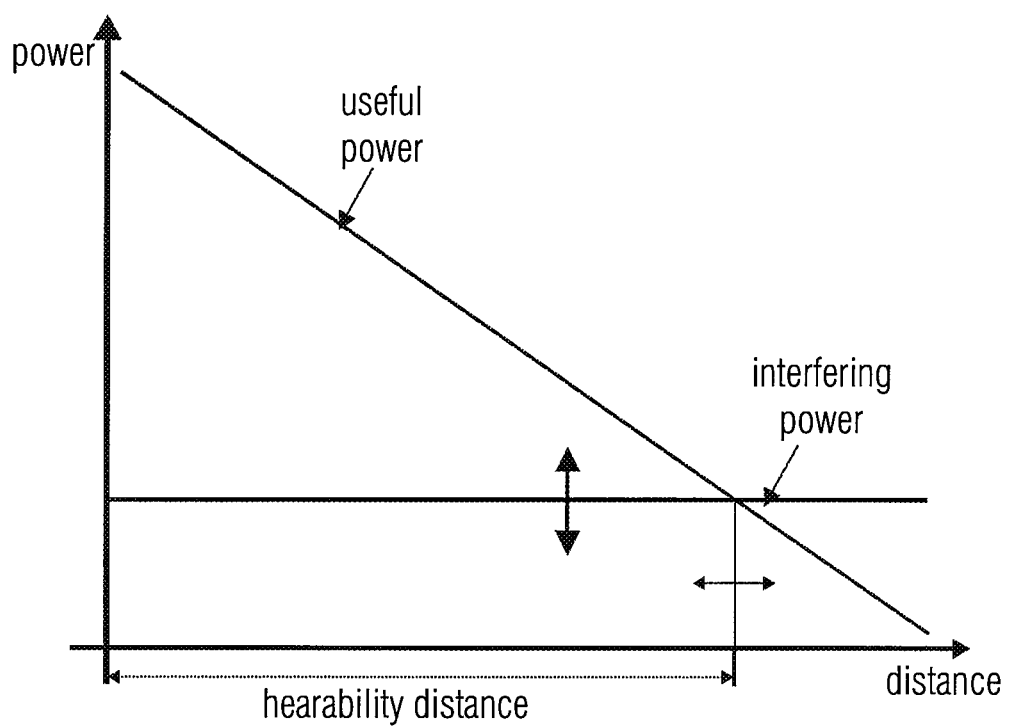
FIG. 13 illustrates a hearability distance or region.

FIG. 11 shows the SINRs achieved at B1 for proposal B. Since the SINR target for B1 is 10 dB, it can be seen that the SINR never falls below this value. The shape of the surface can be explained as follows. M2 is continuously adjusting its transmit power to accommodate for $I_{B1}^{tol}$ at B1. When the SINR conditions as B1 are high enough, M2 can transmit with maximum power, in the figure, this represents the cases when M2 is close to B2 and M1 is close to B1. After a certain point, i.e., the diagonal line, M2 is to reduce its transmit power to allow for the SINR target to be achieved at B1. This is represented by the region, where the SINR is 10 dB for B1. Finally, beyond a certain point, the SINR at B2 falls below 2.2 dB at which stage, M2 switches off which causes a significant boost to the SINR achieved at B1.

From the above section, it is seen that proposals A and B both help B1 achieve an SINR of at least 10 dB. However, it is also to be kept in mind that this is only possible when M2 reduces its transmit power. In light of this, a quick assessment of "fairness" is provided. In this context, fairness indicates the percentage of cases when the SINR at both base stations is above 10 dB.

Benchmark: 54.56%
Proposal A: 58.97%
Proposal B: 73.88%

From the above simulation results it can be seen that both proposals increase the cases when high SINR is achieved at both base stations. However, clearly, in terms of fairness, proposal B performs significantly better than proposal A. Moreover, the simulation results indicate the advantage of embodiments using prioritization of frequency resources giving a clear rule, especially for cell-edge users, which link should be disconnected if mutual interference becomes too severe. Conventional soft-reuse does not provide a solution for such interference scenarios, resulting in a reduced performance.

Depending on certain implementation requirements of the inventive methods, the inventive methods can be implemented in hardware or in software. The implementation can be performed using a digital storage medium, in particular a disc, a DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to the particular embodiments thereof, it will be understood by those skilled in the art that various other changes in the form and details may be made without departing from the spirit and scope thereof. It is to be understood that various changes may be made in adapting to different embodiments without departing from the broader concept disclosed herein and comprehended by the claims that follow.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A mobile transceiver apparatus being adapted for communicating radio signals from/to a base station transceiver, the mobile transceiver apparatus comprising
a receiver module for receiving an information signal from another base station transceiver, the information signal being received with an information signal strength; and
a transmitter module for communicating a transmit radio signal with a transmit power to the base station transceiver, the transmit power being dependent on the information signal strength received from the other base station transceiver,
wherein the transmitter module is adapted for adapting the transmit power inversely proportional to the information signal strength, and/or wherein the receiver module is adapted for receiving an information on a metric C and wherein the transmitter module is adapted for adapting the transmit power proportionally to the metric C.

2. The mobile transceiver apparatus of claim 1, wherein the receiver module is adapted for receiving the information signal on a reception frequency and wherein the transmitter module is adapted for transmitting the transmit radio signal on a transmission frequency, wherein the reception frequency is different from the transmission frequency.

3. The mobile transceiver apparatus of claim 1, wherein the received information signal strength corresponds to a received information signal power and/or wherein the received information signal corresponds to a received interference information from the other base station transceiver.

4. The mobile transceiver apparatus of claim 1, wherein the transmitter module is adapted for further basing the transmit power on a fading margin.

5. The mobile transceiver apparatus of claim 1, wherein the receiver module is adapted for receiving the metric C for multiple frequency resources and wherein the transmitter module is adapted for transmitting on the multiple frequency resources.

6. The mobile transceiver apparatus of claim 5, wherein the receiver module is adapted for receiving an information on a priority per frequency resource and wherein the transmitter module is adapted for adapting a transmit power dependent on the priority of the frequency resource the transmit radio signal is transmitted on.

7. A method for communicating radio signals at a mobile transceiver from/to a base station transceiver, comprising
receiving an information signal from another base station transceiver, the information signal being received with an information signal strength; and
communicating a transmit radio signal with a transmit power to the base station transceiver, the transmit power being dependent on the information signal strength received from the other base station transceiver,
wherein the transmit power is adapted inversely proportional to the information signal strength, and/or wherein an information on a metric C is received and wherein the transmit power is adapted proportionally to the metric C.

8. A computer program comprising a program code for performing
a method for communicating radio signals at a mobile transceiver from/to a base station transceiver, comprising
receiving an information signal from another base station transceiver, the information signal being received with an information signal strength; and
communicating a transmit radio signal with a transmit power to the base station transceiver, the transmit power being dependent on the information signal strength received from the other base station transceiver,
wherein the transmit power is adapted inversely proportional to the information signal strength, and/or wherein an information on a metric C is received and wherein the transmit power is adapted proportionally to the metric C,
when the computer program runs on a computer or processor.

* * * * *